United States Patent [19]

Oyanagi et al.

[11] Patent Number: 4,568,873
[45] Date of Patent: Feb. 4, 1986

[54] EASY-TO-ASSEMBLE CAPACITIVE PROBE FOR A HIGH PRECISION DIMENSIONAL OR DISTANCE GAGE

[75] Inventors: Yoshiki Oyanagi, Fuchu; Susumu Ebara, Yokohama; Shoji Odagiri, Tokyo, all of Japan

[73] Assignee: Iwatsu Electric Co., Ltd., Tokyo, Japan

[21] Appl. No.: 475,027

[22] Filed: Mar. 14, 1983

[30] Foreign Application Priority Data

Mar. 23, 1982 [JP] Japan ............................ 57-40744[U]

[51] Int. Cl.⁴ ........................................... G01R 27/26
[52] U.S. Cl. .................................................. 324/61 P
[58] Field of Search ......... 339/193 P, 108 TP, 147 P; 324/61 R, 61 P

[56] References Cited

U.S. PATENT DOCUMENTS

| | | | |
|---|---|---|---|
| 3,400,331 | 9/1968 | Harris | 324/61 P |
| 3,739,264 | 6/1973 | Resh | 324/61 R |
| 3,771,051 | 11/1973 | Abbe | 324/61 R |
| 3,805,150 | 4/1974 | Abbe | 324/61 R |
| 3,879,660 | 4/1975 | Piso | 324/61 R |
| 4,047,242 | 9/1977 | Jakob | 339/147 P X |
| 4,311,959 | 1/1982 | Riessland | 324/61 P |

Primary Examiner—Stanley T. Krawczewicz
Assistant Examiner—Jose M. Solis
Attorney, Agent, or Firm—Woodcock Washburn Kurtz Mackiewicz & Norris

[57] ABSTRACT

A capacitive probe assembly is comprised of an electrode subassembly and an electric circuit subassembly which can be readily connected to and disconnected from each other, both mechanically and electrically. The electrode subassembly comprises a measuring electrode and a guard electrode concentrically mounted within a tubular, electrically conductive housing while being insulated from each other and from the housing. The measuring and guard electrodes are exposed through one of the opposite open ends of the housing. Inserted in the housing through the other open end thereof, the circuit subassembly includes a circuit board, with measuring circuit elements mounted thereon, which is supported at one end by a plug and at another end by a disclike support. The plug is engaged in sockets in the measuring and guard electrodes for both mechanical and electrical connection of the measuring circuit board to the electrodes. The disclike support is retained in position within the housing by an end cap threadedly engaged in the said other end thereof. The housing is held at ground potential via the end cap, support, and conductive regions on the circuit board.

12 Claims, 5 Drawing Figures

EASY-TO-ASSEMBLE CAPACITIVE PROBE FOR A HIGH PRECISION DIMENSIONAL OR DISTANCE GAGE

BACKGROUND OF THE INVENTION

This invention relates generally to cages for the accurate measurement of dimensions or distances on the basis of capacitance or its variations. More specifically the invention deals with a capacitive probe assembly for such precision dimensional or distance gages.

The probe of a high precision capacitive gage usually takes the form of a concentric arrangement of an electrically conductive housing, a measuring electrode, and a guard electrode. The conductive housing is held at ground potential for shielding the measuring electrode from the influences of external stray capacitances. The guard electrode functions to correct distortions in electric lines of force due to the presence of the grounded housing. The electrodes are exposed through one end of the housing, and this end of the housing, together with the exposed ends of the electrodes, is machined to an exactly planar, mirrorlike finish for the minimization of measuring errors.

As the planar sensing end of the probe is held opposite to a reference electrode, the measuring and reference electrodes combine to make up a capacitor. Thus the variations in capacitance between the electrodes can provide indications of the distance therebetween or of the thickness of an object intervening therebetween.

Stringent requirements are imposed today on capacitive probes. They are required to detect extremely small dimensions or distances or changes in them. Their capacitance-sensing abilities must be several ten times as high as those of the conventional ones. Such high sensitivities are attainable only by making the probes immune to stray capacitances and other environmental influences. Another necessity is to prevent the occurrence of irregularities in the planar sensing surface of the probe, which is made up of materials having different coefficients of thermal expansion, despite changes in temperature and other conditions of use.

These requirements are met to some extent by the probe described and claimed in U.S. Pat. No. 3,805,150 issued to Abbe on Apr. 16, 1974. It has one or more measuring electrodes and one or more balancing electrodes enclosed in an electrically conductive housing which is held at ground potential. Electric circuit means associated with the measuring and balancing electrodes are also contained in the housing. The grounded housing can shield the electrodes and the circuit means from external stray capacitances. A problem common to this and other known types of capacitive probes, however, is the difficulty of assemblage. Moreover, as far as the applicants are aware, there have been suggested no probe constructions providing for the interchange of electrode sections and circuit sections.

SUMMARY OF THE INVENTION

It is therefore an object of this invention to make materially easier the assemblage of a capacitive probe assembly than heretofore by dividing it into an electrode subassembly and an electric circuit subassembly.

Another object of the invention is to make the electrode subassembly and the circuit subassembly readily interchangeable with other subassemblies of different structural features.

A further object of the invention is to provide a capacitive probe assembly which achieves and maintains a high degree of accuracy in sensing capacitance and its variations in the face of changes in temperature.

A still further object of the invention is to provide a capacitive probe assembly of favorable electrical characteristics.

Essentially the capacitive probe assembly in accordance with the invention is a combination of an electrode subassembly and an electric circuit subassembly which admit of ready connection to and disconnection from each other, both mechanically and electrically. The electrode subassembly, comprises an electrically conductive, open-ended housing, and a measuring electrode and a guard electrode mounted within the housing in the vicinity of its first open end, with the guard electrode surrounding the measuring electrode. Both electrodes are insulated from each other and from the housing and each has one end exposed through the first open end of the housing. Sockets are formed in the other ends of the two electrodes.

The electric circuit subassembly, on the other hand, includes a circuit board having measuring circuit means formed thereon and placed within the housing. The circuit board has one of its opposite ends mechanically coupled to a plug which is inserted in the sockets in the measuring and guard electrodes of the electrode subassembly. The electrodes are electrically connected through the plug to required parts of the circuit means on the circuit board. Supporting the other end of the circuit board, support means coact with the plug to hold the circuit board in position within the housing and serve also to close the second open end of the housing.

As is apparent from the foregoing summary of the invention, the electrode subassembly and the circuit subassembly can be separately assembled. The capacitive probe assembly can then be completed simply as the circuit subassembly is inserted into the housing, a part of the electrode subassembly, through its second open end until the plug becomes lodged in the sockets in the measuring and guard electrodes. The plug functions not only to mechanically connect the circuit subassembly to the electrode subassembly but also to provide electrical connections between the measuring and guard electrodes and the circuit means on the circuit board.

The ease of assemblage is not the sole advantage accruing from the division of the capacitive probe assembly into the electrode subassembly and the circuit subassembly. There may be prepared electrode subassemblies and circuit subassemblies of various structural features. They will be interchangeable only if the sockets of the electrode subassemblies and the plugs of the circuit subassemblies are standardized. Thus, for example, a single circuit subassembly may be put to use with several electrode subassemblies having measuring faces of different areas.

The above and other objects, features and advantages of this invention and the manner of attaining them will become more apparent, and the invention itself will best be understood, from a study of the following description of a preferred embodiment illustrated in the attached drawings.

DESCRIPTION OF THE PREFERRED EMBODIMENT

Figure 1:
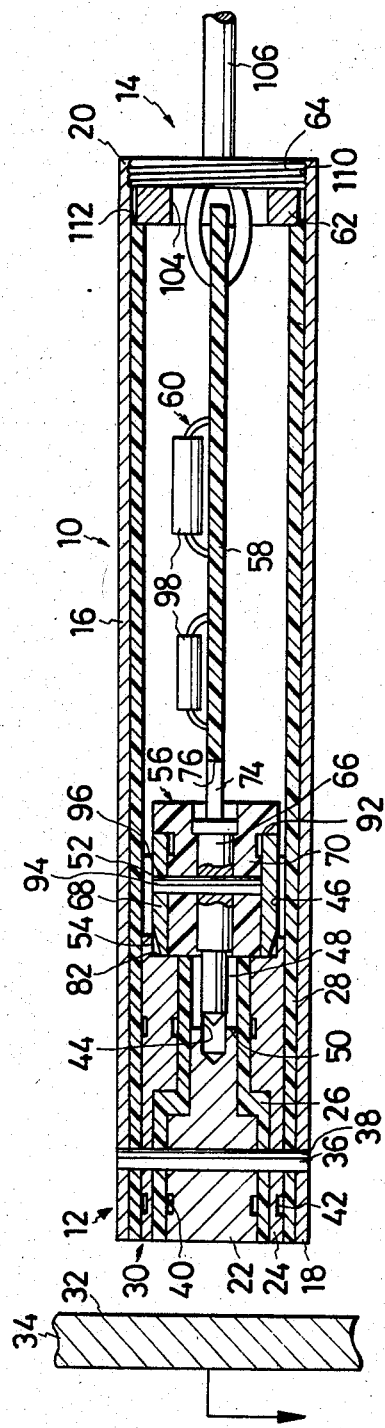
FIG. 1 is an axial section through the capacitive probe assembly constructed in accordance with the novel concepts of this invention, the probe assembly being herein shown together with a reference electrode which is to make up a capacitor in combination with the measuring electrode of the probe assembly and which is used for the measurement of the distance between itself and the probe assembly or of the thickness of an object intervening therebetween.

The preferred form of the capacitive probe assembly in accordance with the invention is shown in its entirety in FIG. 1 and therein generally designated 10. The probe assembly 10 is basically composed of an electrode subassembly 12, illustrated on an enlarged scale in FIG. 2, and an electric circuit subassembly 14 drawn on an equally enlarged scale in FIG. 3. Assembled separately, the two subassemblies 12 and 14 allow ready connection, both mechanically and electrically, to each other to provide the probe assembly 10. The circuit subassembly 14 includes electric measuring circuitry two examples of which are given in FIGS. 4 and 5. The following is the detailed discussion, under the respective headings, of these subassemblies 12 and 14 and measuring circuitry of the probe assembly 10.

Electrode Subassembly

Figure 2:
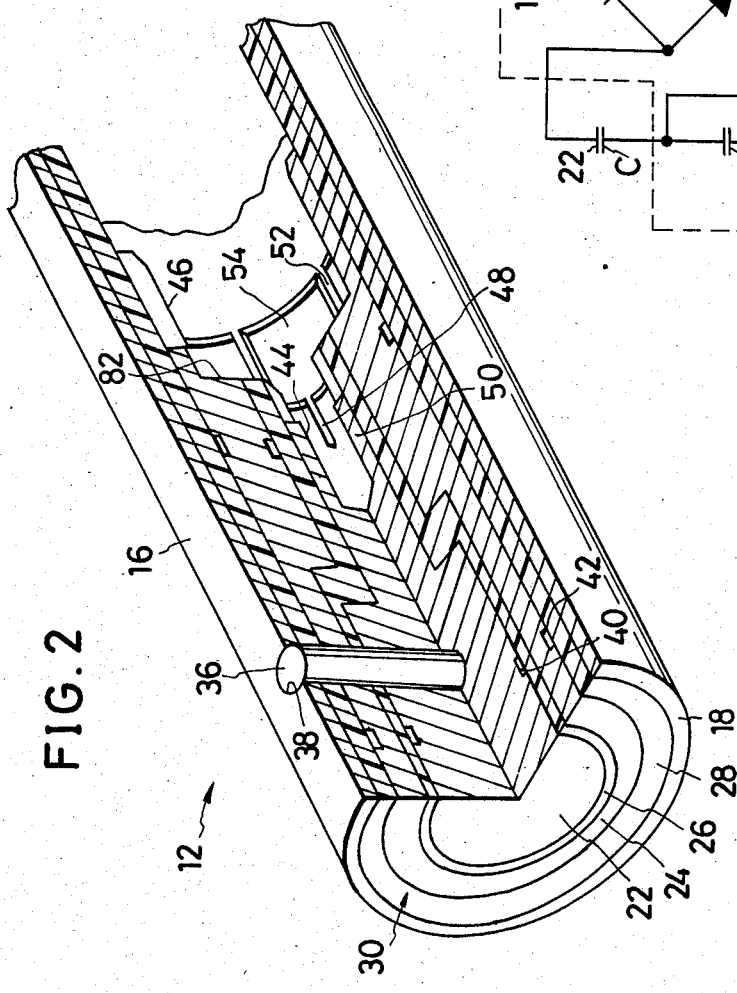
FIG. 2 is an enlarged, fragmentary perspective view, partly sectioned for clarity, showing only the electrode subassembly of the capacitive probe assembly of FIG. 1.

With reference to both FIGS. 1 and 2 the electrode subassembly 12 comprises:

1. A tubular, electrically conductive housing 16 having first 18 and second 20 open ends.

2. A measuring electrode 22 in the form of a stepped cylinder disposed axially within the housing 16 in the adjacency of its first open end 18.

3. A guard electrode 24 of substantially tubular shape concentrically surrounding the measuring electrode 22 within the housing 16.

4. First 26 and second 28 insulating sleeves supporting the measuring electrode 22 and guard electrode 24 within the housing 16 and electrically insulating the electrodes from each other and from the housing.

The housing 16 is made of metal and is to be electrically grounded in the use of the probe assembly 10, as will be later described in more detail. This housing accommodates not only the electrodes 22 and 24 and the insulating sleeves 26 and 28 but also all, or nearly all, parts of the electric circuit subassembly 14. The axial dimension of the housing is therefore considerably more than those of the electrodes 22 and 24 and the first insulating sleeve 26. Only the second insulating sleeve 28, however, is of approximately the same length as the housing 16, extending rearwardly therewith and terminating just short of its second open end 20. The reason for this will become apparent from the subsequent description of the circuit subassembly 14.

Made of stainless steel or like metal, the measuring electrode 22 is mounted concentrically within the housing 16, with its front end exposed through the first open end 18 of the housing. The guard electrode 24, also of suitable metal, concentrically surrounds the measuring electrode 22 via the first insulating sleeve 26. The front end of this guard electrode is also exposed through the first open end 18 of the housing 16. The first 26 and second 28 insulating sleeves can both be molded of plastics material such as, typically, polytetrafluoroethylene.

It will have been seen that the housing 16, the measuring electrode 22, guard electrode 24, and the two insulating sleeves 26 and 28 are all of coaxial arrangement. The front end of the assembly of these components, including the first open end 18 of the housing 16, is processed into a planar, mirrorlike surface to provide a measuring face, generally referenced 30, of circular shape. In the use of the probe assembly 10 the measuring face 30 is to be held opposite to the surface 32 of a reference electrode 34, FIG. 1, for the measurement of the distance between the measuring electrode 22 and the reference electrode 34, or of the thickness of an object intervening therebetween.

At 36 in FIGS. 1 and 2 is seen a lockpin of electrically insulating material pressfitted in a hole 38 drilled diametrically through the housing 16, electrodes 22 and 24, and insulating sleeves 26 and 28. The lockpin 36 functions to prevent the relative axial, as well as angular, displacement of these components of the electrode subassembly 12. Polycarbonate is a recommended material for the lockpin 36.

In the use of the probe assembly 10 it is essential that the measuring face 30 remain exactly planar despite changes in the volumes of the first 26 and second 28 insulating sleeves with temperatures. Toward this end the measuring electrode 22 has an annular relief recess 40 formed in its outer surface to take up the volumetric changes of the first insulating sleeve 26. The guard electrode 24 also has an annular relief recess 42 formed in its outer surface to take up the volumetric changes of the second insulating sleeve 28.

It will be noted that both relief recesses 40 and 42 are located intermediate the measuring face 30 and the lockpin 36. The lockpin itself is situated sufficiently close to the measuring face 30. Thus the lockpin 36 and the relief recesses 40 and 42 coact to maintain the measuring face 30 precisely planar under varying conditions of use.

The electrode subassembly 12 further includes provisions for ready mechanical and electrical connection to, and disconnection from, the electric circuit subassembly 14. The connect-disconnect provisions on the side of the electrode subassembly 12 are a socket 44 formed in the rear end of the measuring electrode 22 and another socket 46 formed in the rear end of the guard electrode 24. The two sockets 44 and 46 are concentric, with the measuring electrode socket 44 disposed forwardly of the guard electrode socket 46. Several slits 48 are cut at constant angular spacings in a tubular wall 50 defining the socket 44 and forming part of the measuring electrode 22. Similar slits 52 are also formed in a tubular wall 54 defining the socket 46 and forming part of the guard electrode 24.

Electric Circuit Subassembly

Figure 3:
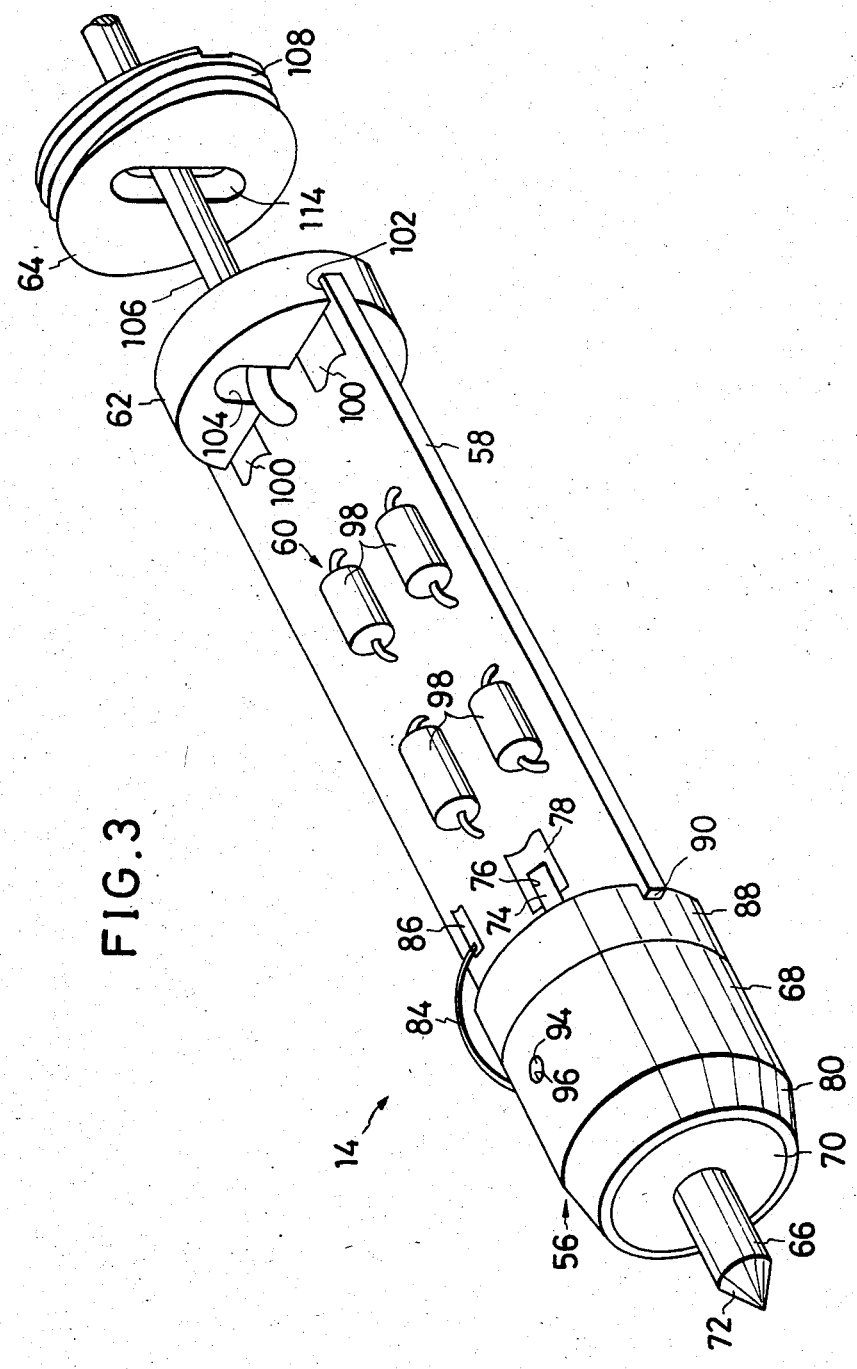
FIG. 3 is an enlarged perspective view showing the circuit subassembly to be combined with the electrode subassembly of FIG. 2 to make up the probe assembly of FIG. 1.

The construction of the electric circuit subassembly 14 will become clear from a study of FIGS. 1 and 3. The circuit subassembly comprises:

1. A plug 56 removably inserted in the concentric sockets 44 and 46 in the measuring 22 and guard 24 electrodes of the electrode subassembly 12 in both mechanical and electrical engagement with the electrodes.

2. A circuit board 58 having measuring circuit means 60 arranged thereon and having its front end rigidly coupled to the plug 56.

3. A disclike support 62 firmly holding the rear end of the circuit board 58.

4. An end cap 64 screw-threadedly engaged in the second open end 20 of the housing 16 and held against the support 62 to retain same in position within the housing.

The plug 56 represents the connect-disconnect provision on the side of the circuit subassembly 14, coacting with the sockets 44 and 46 of the electrode subassembly 12 to allow the easy mechanical and electrical connection and disconnection of the two subassemblies. The plug 56 comprises a connector pin 66 partly received in the socket 44 in the measuring electrode 22, a connector annulus 68 concentrically surrounding the connector pin and at least partly, or nearly completely, received in the socket 46 in the guard electrode 24, and an insulating sleeve 70 interposed between connector pin and connector annulus for electrically insulating them from each other.

Projecting forwardly of the connector annulus 68 and insulating sleeve 70, the connector pin 66 terminates in a tapered end 72 for easy insertion in the measuring electrode socket 44. The slitted tubular wall 50 defining this socket 44 is self-biased into firm, but separable, mechanical and electrical engagement with the connector pin 66. The rear end 74 of the connector pin 66 also projects out of the insulating sleeve 70 and is received in a recess 76 in the circuit board 58. A conductive region 78 on the circuit board 58, ending at the recess 76, is soldered to the rear end 74 of the connector pin 66 thereby to be electrically connected thereto. The soldering is also effective to establish mechanical connection between circuit board 58 and connector pin 66 or between circuit board 58 and plug 56.

The connector annulus 68 of the plug 56 has a tapering front end 80 for ready insertion in the socket 46 in the guard electrode 24. The slitted tubular wall 54 defining this socket 46 is also self-biased into firm, but separable, mechanical and electrical engagement with the connector annulus 68. It will be recognized from FIGS. 1 and 2 that the guard electrode 24 has an annular shoulder at 82. The plug 56 is to be inserted in the sockets 44 and 46 until the coplanar front ends of the connector annulus 68 and insulating sleeve 70 become seated against the shoulder 82 of the guard electrode 24. The full insertion of the plug 56 in the sockets 44 and 46 results also in the correct positioning of the circuit subassembly 14 relative to the electrode subassembly 12. A lead 84, FIG. 3, electrically connects a conductive region 86 on the circuit board 58 to the connector annulus 68 and thence to the guard electrode 24.

Preferably molded of polytetrafluoroethylene, the insulating sleeve 70 of the plug 56 is concentrically interposed between connector pin 66 and connector annulus 68 for electrically insulating them from each other and for mechanically holding them together. While the front end of this insulating sleeve is flush with the front end of the connector annulus 68, its rear end 88 projects beyond the rear end of the connector annulus and is increased in diameter to approximately the same extent as the external diameter of the connector annulus. The greater diameter rear end 88 of the insulating sleeve 70 has a groove 90 formed diametrically therein for closely receiving the opposed end of the circuit board 58. Thus engaged in the groove 90 in the insulating sleeve 70 the circuit board 58 is restrained from angular displacement relative to the plug 56. It will now be seen that the circuit board 58 is dually mechanically coupled to the plug 56, by the soldering of the conductive region 78 on the circuit board to the connector pin 66 of the plug and by the engagement of the circuit board in the groove 90 in the insulating sleeve 70 of the plug. An annular groove 92 is formed in the outer surface of the insulating sleeve 70, near its greater diameter rear end 88, to allow for the thermal expansion of the sleeve.

A lockpin 94 of electrically insulating material is pressfitted in a hole 96 extending diametrically through the plug 56. Thus the constituent members of the plug 56, the connector pin 66, connector annulus 68 and insulating sleeve 70, are locked against relative displacement in any direction.

The circuit board 58 has arranged thereon electrical components 98, conductive regions 78, 86, 100, etc., making up the measuring circuitry yet to be described. The rear end of this circuit board is tightly engaged in a groove 102 formed diametrically in one face of the disclike support 62. Made of metal, the support 62 is soldered to the conductive regions 100 on the circuit board 58 which are to be grounded. Thus, at its rear end, too, the circuit board 58 is dually mechanically coupled to the support 62, by being engaged in the groove 102 in the support and by having the conductive regions 100 soldered thereto.

The support 62 has a slot 104 formed therethrough. Extending through this slot is a cable 106 for electrically connecting the measuring circuit means 60 on the circuit board 58 to external electrical means (not shown).

The foregoing will have made clear the construction of the circuit subassembly 14. The circuit board 58 has its front end engaged in the groove 90 in the insulating sleeve 70 of the plug 56 and is further soldered to its connector pin 66. The rear end of the circuit board 58, on the other hand, is engaged in the groove 102 in the support 62 and is further soldered thereto. Thus the plug 56, the circuit board 58, and the support 62, together with the measuring circuit means 60 on the circuit board, are positively mechanically interconnected to constitute the integrated electric circuit subassembly 14. It will also be appreciated that in the completed capacitive probe assembly 10 of FIG. 1, the plug 56 and the support 62 coact to hold the circuit board 58 in a preassigned position within the housing 16.

The end cap 64 is also metal made. It is screw threaded at 108 to mate with an internal thread 110 at the rear end of the housing 16. When screwed into the housing 16 as in FIG. 1, the end cap 64 functions not only to close its open rear or second end 20 but also to press the support 62 against the rear end 112 of the second insulating sleeve 28 of the electrode subassembly 12, thereby immovably holding the support 62 in place within the housing. Further, with the end cap 64 thus engaged in its rear end, the housing 16 of electrically conductive material is electrically grounded through the path comprising the end cap 64, the support 62, the conductive regions 100 on the circuit board 58, and a grounding conductor (not shown) in the cable 106. The end cap 64 is slotted at 114 for the passage of the cable 106 therethrough. Strictly speaking, the end cap 64, a discrete unit, belongs neither to the circuit subassembly 14 nor to the electrode subassembly 12.

The electrode subassembly 12 of FIG. 2 and the circuit subassembly 14 of FIG. 3 described hereinbefore are to be assembled separately. Then the circuit subassembly 14 is inserted into the housing 16 of the electrode subassembly 12 until the plug 56 becomes fully received in the concentric sockets 44 and 46 in the electrodes 22 and 24, with the consequent establishment of mechanical and electrical connections between the two subassemblies. The capacitive probe assembly 10 of FIG. 1 is completed as then the end cap 64 is driven into the open rear or second end 20 of the housing 16.

The disassemblage of the probe assembly 10 is just as easy. The end cap 64 may first be removed from the rear end of the housing 16. Then the circuit subassembly 14 may be pulled out of the housing of the electrode subassembly 12.

Electric Circuitry

Figure 4:
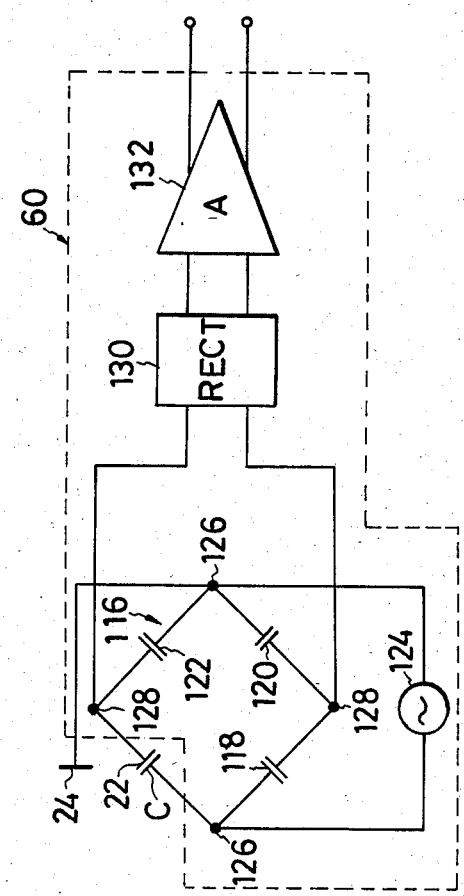
FIG. 4 is a schematic electrical diagram of an example of measuring circuitry suitable for use in the probe assembly of FIG. 1.

FIG. 4 diagrammatically illustrates an example of electric measuring circuitry for use in the capacitive probe assembly 10 of FIG. 1. In this figure the parts shown enclosed in the dashed outline generally designated 60 are placed on the circuit board 58 of the circuit subassembly 14, as best depicted in FIG. 3.

The letter C in FIG. 4 denotes what is in essence a capacitor which is formed by the measuring electrode 22 of the electrode subassembly 12 and the reference electrode 34 as the measuring face 30 of the probe assembly 10 is held opposite to the surface 32 of the reference electrode as in FIG. 1. The capacitor C makes up a bridge circuit 116 in combination with three other capacitors 118, 120 and 122 on the circuit board 58. A high frequency oscillator or current source 124 is connected to a pair of opposite junction points 126 of the bridge circuit 116. One of these junction points 126 is also connected to the guard electrode 24. The other pair of opposite junction points 128 of the bridge circuit are connected to a rectifier 130 and thence to an amplifier 132.

Figure 5:
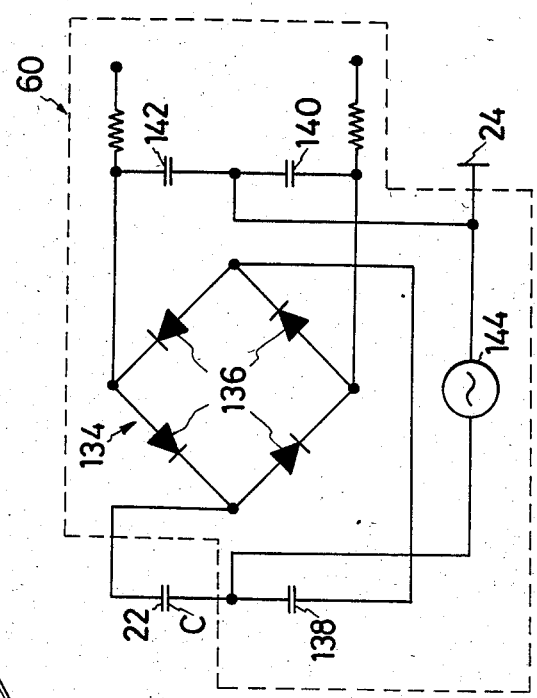
FIG. 5 is a schematic electrical diagram of another example of measuring circuitry suitable for use in the probe assembly of FIG. 1.

FIG. 5 is a diagrammatic representation of another example of measuring circuitry for use in the capacitive probe assembly 10 of FIG. 1. This alternative circuitry includes a ring modulator 134 comprising four diodes 136 connected in series to form a ring. Also included are capacitors 138, 140 and 142, an oscillator 144, the capacitor C including the measuring electrode 22, and the guard electrode 24, which are connected as shown. As in FIG. 4, the parts shown enclosed in the dashed outline labeled 60 are to be placed on the circuit board 58 of the circuit subassembly 14.

Operation

The capacitive probe assembly 10 constructed as in the foregoing may be used for the measurement of either the distance, or variations in distance, between its measuring face 30 and the opposed surface 32 of the reference electrode 34, or of the thickness of an object, not shown, intervening therebetween. For the first recited purpose the measuring face 30 of the probe assembly 10 may be held opposite to the surface 32 of the reference electrode 34 in order that the capacitor C of FIG. 4 or 5 may be formed by the measuring electrode 22 and the reference electrode 34. The distance or its variations between the opposed electrodes can be ascertained to a very high degree of accuracy from the capacitance of the capacitor C.

For gaging the thickness of a desired object this object may be interposed between the measuring face 30 of the capacitive probe assembly 10 and the surface 32 of the reference electrode 34. The thickness can be obtained from the variation in capacitance between measuring electrode 22 and reference electrode 34.

The advantages gained by the division of the probe assembly 10 into the electrode subassembly 12 and the circuit subassembly 14 have already been stated in the Summary of the invention. The probe assembly as disclosed herein further offers the following advantages:

1. In the electrode subassembly 12 the lockpin 36 positively locks the housing 16, measuring electrode 22, guard electrode 24, and insulating sleeves 26 and 28 against displacement relative to each other. Further the electrodes 22 and 24 have relief recesses 40 and 42 to accommodate the volumetric changes of the insulating sleeves 26 and 28. Accordingly no irregularities are to occur in the measuring face 30 of the probe assembly despite changes in temperature or other conditions of use, resulting in a high degree of measuring sensitivity and accuracy.

2. The plug 56 of the circuit subassembly 14 also has the lockpin 94 firmly retaining the connector pin 66, connector annulus 68 and insulating sleeve 70 in their predetermined relative positions. The plug can thus be readily inserted in the concentric sockets 44 and 46 to establish the positive mechanical and electrical connections between electrode subassembly 12 and circuit subassembly 14.

3. The circuit board 58 of the circuit subassembly 14 is securely supported in position within the housing 16 as its opposite ends are mechanically connected to the plug 56 and to the support 62.

4. With the electrode subassembly 12 and circuit subassembly 14 engaged with each other, they can be locked against any possibility of accidental disengagement or relative displacement by the end cap 64 threadedly engaged in the rear end of the housing 16. The end cap 64 serves the additional purpose of adjusting the relative positions of the electrode and circuit subassemblies according to the extent to which it is screwed into the housing 16.

5. The direct electrical connection of the measuring electrode 22 to the measuring circuit means 60 on the circuit board 58 via the connector pin 66 assures the wide-band performance of the probe assembly. 6. The grounded housing 16 completely encloses the measuring electrode 22 and measuring circuit means 60, resulting in the reduction of stray capacitances and in the higher degree of measuring accuracy.

Modifications

The preferred embodiment disclosed herein is meant purely to illustrate or explain and not to impose limitations upon the invention, as a variety of modifications will readily occur to the specialists on the basis of this disclosure. The following is a brief list of such possible modifications:

1. The housing 16, measuring electrode 22, guard electrode 24, etc., may not necessarily be of circular or annular cross section but may be polygonal, elliptic, etc., in cross sectional shape.

2. Contrary to the showings of FIGS. 1 and 3 the connector annulus 68 of the plug 56 may be extended rearwardly until it becomes flush with, or even projects beyond, the rear end of the insulating sleeve 70. The rear end of the connector annulus may further be slotted to closely engage the front end of the circuit board 58, thereby establishing a mechanical connection between plug 56 and circuit board 58. It is also possible in this manner to electrically connect the connector annulus to the desired conductive region on the circuit board as by soldering them together, instead of interconnecting them via the lead 84 as in the illustrated embodiment.

3. As an additional alternative the rear end of the connector pin 60 of the plug 56 may be grooved to tightly receive the front end of the circuit board 58. Thus, all that is required for the mechanical connection between plug 56 and circuit board 58 is that at least either of the connector pin 66, connector annulus 68 and insulating sleeve 70 be in direct engagement with the circuit board.

4. The illustrated embodiment employs soldering and the interengagement of the parts for the mechanical connections between plug 56 and circuit board 58 and between circuit board and support 62. While this method of connection is satisfactory for all practical purposes, adhesives or mechanical couplings may be adopted as required in cases where more solid connections are desired.

5. Two or more lockpins could be used for locking together the electrode subassembly 12 and the plug 56 of the circuit subassembly 14.

6. The probe assembly of this invention finds use with various types of electric measuring systems other than the two examples given in FIGS. 4 and 5.

7. Not all but only some of the parts of the FIG. 4 measuring circuitry shown enclosed in the dashed outline may be arranged on the circuit board 58. For example, only the capacitors 118, 120 and 122, or these capacitors and the rectifier 130, may be mounted on the circuit board. However, the placement of at least the three capacitors 118, 120 and 122 on the circuit board is preferred.

8. In the case of the FIG. 5 measuring circuitry, too, only some of the parts shown enclosed in the dashed outline may be mounted on the circuit board. Examples are the four diodes 136 and the capacitors 138, 140 and 142.

9. The amplifier 132 of the FIG. 4 measuring circuitry could be omitted.

10. The end cap 64 could be in the form of a short tube closed at one end and internally threaded to fit over the rear end of the housing 16.

All these and other modifications or variations of the invention are intended in the foregoing disclosure. It is therefore appropriate that the invention be construed broadly and in a manner consistent with the fair meaning or proper scope of the following claims.

What is claimed is:

1. In a gage for accurately measuring dimensions or distances by sensing capacitance, a capacitive probe assembly comprising:
   (a) an electrode subassembly comprising:
      (1) an electrically conductive housing having first and second open ends;
      (2) a measuring electrode disposed within the housing and having one end exposed through the first open end of the housing, the measuring electrode having a socket formed in another end;
      (3) a guard electrode surrounding the measuring electrode within the housing and having one end exposed through the first open end of the housing, the guard electrode also having a socket formed in another end; and
      (4) means for supporting the measuring electrode and the guard electrode within the housing and electrically insulating the electrodes from each other and from the housing;
   (b) an electric circuit subassembly capable of ready mechanical and electrical connection to and disconnection from the electrode subassembly, the circuit subassembly comprising:
      (1) a plug disposed within the housing and inserted in the sockets in the measuring electrode and guard electrode in both mechanical and electrical engagement therewith;
      (2) a circuit board disposed within the housing and having one end mechanically coupled to the plug;
      (3) measuring circuit means on the circuit board having parts separately electrically connected to the measuring electrode and guard electrode through the plug; and
      (4) support means supporting another end of the circuit board to hold same in a preassigned position within the housing in coaction with the plug, the support means serving also to close the second open end of the housing.

2. The capacitive probe assembly as set forth in claim 1, wherein the sockets in the measuring electrode and guard electrode of the electrode subassembly are defined by substantially tubular walls forming parts of the measuring and guard electrodes respectively, the tubular walls being slitted to be resiliently held against the plug inserted therein.

3. The capacitive probe assembly as set forth in claim 1, wherein the supporting and insulating means of the electrode subassembly comprises:
   (a) a first insulating sleeve surrounding the measuring electrode and surrounded by the guard electrode; and
   (b) a second insulating sleeve surrounding the guard electrode and surrounded by the housing.

4. The capacitive probe assembly as set forth in claim 3, wherein the measuring electrode, the guard electrode, and the first and second insulating sleeves have ends disposed flush with the first open end of the housing to provide a planar measuring face.

5. The capacitive probe assembly as set forth in claim 3, further comprising a lockpin closely inserted in a hole formed through the housing, the measuring and guard electrodes, and the first and second insulating sleeves, in order to positively maintain same in preassigned relative positions.

6. The capacitive probe assembly as set forth in claim 3, wherein the measuring electrode has a relief recess formed in its outer surface to takeup volumetric changes of the first insulating sleeve with temperatures.

7. The capacitive probe assembly as set forth in claim 3, wherein the guard electrode has a relief recess formed in its outer surface to take up volumetric changes of the second insulating sleeve with temperatures.

8. The capacitive probe assembly as set forth in claim 1, wherein the plug of the electric circuit assembly comprises:
   (a) a connector pin having one end received in the socket in the measuring electrode and another end electrically connected to the measuring circuit means on the circuit board;

(b) a connector annulus at least partly received in the socket in the guard electrode and electrically connected to the measuring circuit means on the circuit board; and (c) an insulating sleeve surrounding the connector pin and surrounded by the connector annulus for insulating them from each other;

(d) at least either of the connector pin, the connector annulus, and the insulating sleeve being mechanically coupled to the one end of the circuit board.

9. The capacitive probe assembly as set forth in claim 8, wherein the plug further comprises a lockpin closely inserted in a hole formed through the connector annulus, the insulating sleeve, and the connector pin, in order to positively maintain same in preassigned relative positions.

10. The capacitive probe assembly as set forth in claim 1, wherein the support means of the electric circuit subassembly comprises:

(a) a support member mechanically engaged with the circuit board within the housing; and (b) an end cap screw-threadedly engaged in the second open end of the housing to close same and held against the support member to retain same in place within the housing.

11. The capacitive probe assembly as set forth in claim 10, wherein the support member and end cap of the support means are both of electrically conductive material, and wherein the electrically conductive housing is grounded through the end cap, the support member and the measuring circuit means on the circuit board.

12. In a gage for accurately measuring dimensions or distances by sensing capacitance, a capacitive probe assembly comprising:

(a) an electrode subassembly comprising:

(1) an electrically conductive tubular housing having first and second opposing open ends;

(2) a measuring electrode disposed entirely within the housing and having only an end surface exposed through a first open end of the housing, the measuring electrode having a socket formed in its opposing end;

(3) a guard electrode surrounding the measuring electrode, disposed entirely within the housing and having only an end surface exposed through the first open end of the housing, the guard electrode also having a socket formed in its opposing end;

(4) means for supporting the measuring electrode and the guard electrode within the housing and electrically insulating the electrodes from each other and from the housing including a first insulating sleeve surrounding the measuring electrode and surrounded by the guard electrode and entirely filling a gap between the measuring electrode and the guard electrode at the first open end of the housing and a second insulating sleeve surrounding the guard electrode and surrounded by the housing and entirely filling a gap between the guard electrode and the housing at the first open end of the housing; and (5) the measuring electrode, guide electrode, first insulating sleeve and second insulating sleeve having ends disposed flush with the first open end of the housing and finished to provide a continuous, mirror-like smooth measuring surface with the housing at the first open end of the housing;

(b) an electrical circuit subassembly capable of ready mechanical and electrical connection to and disconnection from the electrode subassembly for insertion into and removal from the second open end of the housing, the circuit subassembly comprising:

(1) a plug disposed within the housing and inserted into said measuring electrode socket and guard electrode socket in both mechanical and electrical engagement therewith;

(2) a circuit board within the housing and having one end mechanically coupled to the plug;

(3) measuring circuit means on the circuit board having parts separately electrically connected to the measuring electrode and guard electrode through the plug; and (4) support means at another end of the circuit board to hold said board in a preassigned position within the housing in coaction with the plug, the support means serving also to close the second open end of the housing.

* * * * *

UNITED STATES PATENT AND TRADEMARK OFFICE
CERTIFICATE OF CORRECTION

PATENT NO. : 4,568,873

DATED : Feb. 4, 1986

INVENTOR(S) : Yoshiki Oyanagi, Susumu Ebara, Shoji Odagiri

It is certified that error appears in the above-identified patent and that said Letters Patent is hereby corrected as shown below:

Claim 12, column 12, line 17, delete "guide"

and substitute --guard--therefor.

Signed and Sealed this

Ninth Day of September 1986

[SEAL]

Attest:

DONALD J. QUIGG

Attesting Officer

Commissioner of Patents and Trademarks